(12) United States Patent
Kato (10) Patent No.: US 6,493,143 B2
(45) Date of Patent: *Dec. 10, 2002

(54) DIFFRACTIVE OPTICAL ELEMENT AND OPTICAL SYSTEM INCORPORATING THE SAME

(75) Inventor: Takashi Kato, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,009

(22) Filed: Apr. 27, 1998

(65) Prior Publication Data

US 2001/0001583 A1 May 24, 2001

(30) Foreign Application Priority Data

Apr. 30, 1997 (JP) ............................................. 9-126337

(51) Int. Cl.⁷ ................................................. G02B 5/18
(52) U.S. Cl. ...................... 359/566; 359/354; 359/356; 359/565; 359/569; 359/571; 359/708; 372/44; 372/45; 372/46
(58) Field of Search ................................. 359/566, 565, 359/356, 569, 354, 708, 571; 372/44, 45, 46

(56) References Cited

U.S. PATENT DOCUMENTS

| 3,728,009 | A | * | 4/1973 | Fedotowsky et al. ....... 350/162 |
|---|---|---|---|---|
| 5,044,706 | A | * | 9/1991 | Chen ........................... 359/357 |
| 5,221,835 | A | | 6/1993 | Setani ...................... 250/208.1 |
| 5,227,915 | A | | 7/1993 | Grossinger et al. ......... 359/565 |
| 5,432,588 | A | * | 7/1995 | Kamon ......................... 355/71 |
| 5,448,581 | A | * | 9/1995 | Wu et al. ..................... 372/45 |
| 5,561,558 | A | | 10/1996 | Shiono et al. .............. 359/569 |
| 5,790,321 | A | * | 8/1998 | Goto ........................... 359/742 |
| 5,986,779 | A | * | 11/1999 | Tanaka et al. ................ 359/19 |

FOREIGN PATENT DOCUMENTS

| JP | 62-229203 | 10/1987 |
|---|---|---|
| JP | 6-242373 | 9/1994 |
| JP | 7-128590 | 5/1995 |

* cited by examiner

Primary Examiner—Audrey Chang
Assistant Examiner—Craig Curtis
(74) Attorney, Agent, or Firm—Fitzpatrick, Cella, Harper & Scinto (57) ABSTRACT

A diffractive optical element, as well as an optical system incorporating the same, has a comparatively large minimum grating pitch and, hence, is easy to produce. The diffractive optical element has a diffraction grating surface and an aspherical surface formed on an identical substrate or on separate substrates. The pitch of the diffractive grating varies such that it progressively decreases radially outward from the center of the substrate and then kept constant towards the radially outer extremity of the substrate.

13 Claims, 10 Drawing Sheets

PROCESS STEP A

PROCESS STEP E

PROCESS STEP B

PROCESS STEP F

PROCESS STEP C

PROCESS STEP G

PROCESS STEP D

PROCESS STEP H

DIFFRACTIVE OPTICAL ELEMENT AND OPTICAL SYSTEM INCORPORATING THE SAME

BACKGROUND OF THE INVENTION

1. Field of the Invention

The present invention relates to a diffractive optical element and also to an optical system incorporating such a diffractive optical element. More particularly, the present invention pertains to a diffractive optical element, as well as to an optical system, suitable for use in optical devices and apparatuses such as, for example, photographic cameras, video cameras, binoculars, and projection exposure apparatuses used in semiconductor production.

2. Description of the Related Art

Various types of optical systems have recently been proposed, among which are noted those which incorporate diffractive optical elements capable of diffracting light rays, such as Fresnel zone plates, diffraction gratings, holographic elements, and so forth.

In general, a diffractive optical element is used as an optical element that converts an incident wavefront into a predetermined wavefront. Diffractive optical elements exhibit characteristics that cannot be obtained with ordinary refractive lenses. For instance, diffractive optical elements show dispersive power which is reciprocal to that of refractive lenses. In addition, diffractive optical elements do not have substantial thickness and, therefore, serve to reduce the size of an optical system when incorporated in such an optical system.

Techniques employed in semiconductor production can be applied to production of diffractive optical elements, provided that the elements are designed to have binary configurations. This permits rather easy production of diffraction gratings even when the gratings have very small pitches. For this reason, intense studies are being made on binary-type diffractive optical elements in which blazed configurations are approximated by step forms.

Figure 9A:
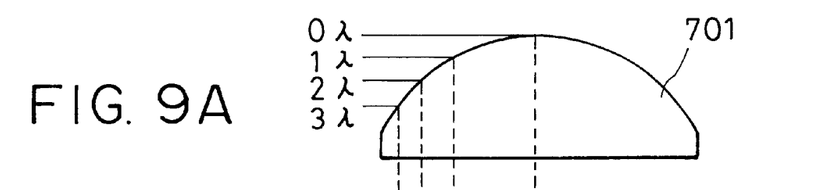
FIGS. 9A to 9C are illustrations of a process for producing a binary-type diffractive optical element.
Figure 9B:
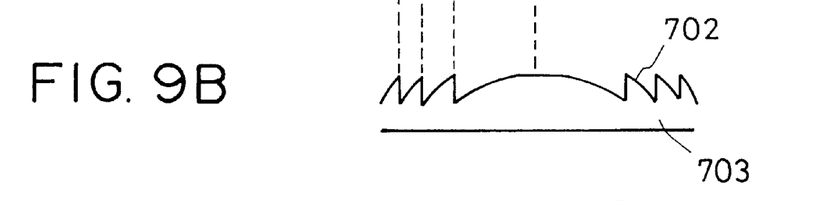
Figure 9C:
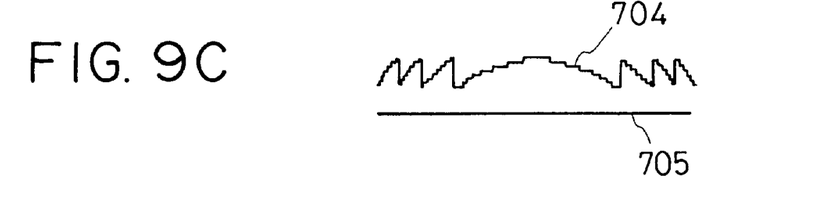

FIGS. 9A to 9C are illustrations of a concept of a binary-type diffractive optical element. More specifically, FIG. 9A shows a plano-convex refractive lens 701 and FIG. 9B shows a kinoform-type diffractive optical element, i.e., a Fresnel lens, denoted by 702. The element 702 is formed by removing, from the lens 701 shown in FIG. 9A, portions which provide optical path differences amounting to integer multiples of wavelength. FIG. 9C shows a binary-type diffractive optical element which is obtained by binarily approximating the configuration of the Fresnel lens 702: namely, by quantizing the configuration of the Fresnel lens 702 into step form with a step height which is a fraction of the wavelength. Numerals 703 and 705 appearing in FIGS. 9B and 9C denote a transparent substrate. In FIG. 9B, the surface of the transparent substrate has been processed to have a minute pattern which provides the kinoform-type diffractive optical element, whereas, in FIG. 9C, the surface of the substrate 705 has been processed to have a minute step pattern which implements the diffractive optical element 704. As stated before, the approximation of the diffraction grating pattern by the step configuration permits the introduction of ordinary LSI production techniques into the production of the diffractive optical elements.

Figure 10:
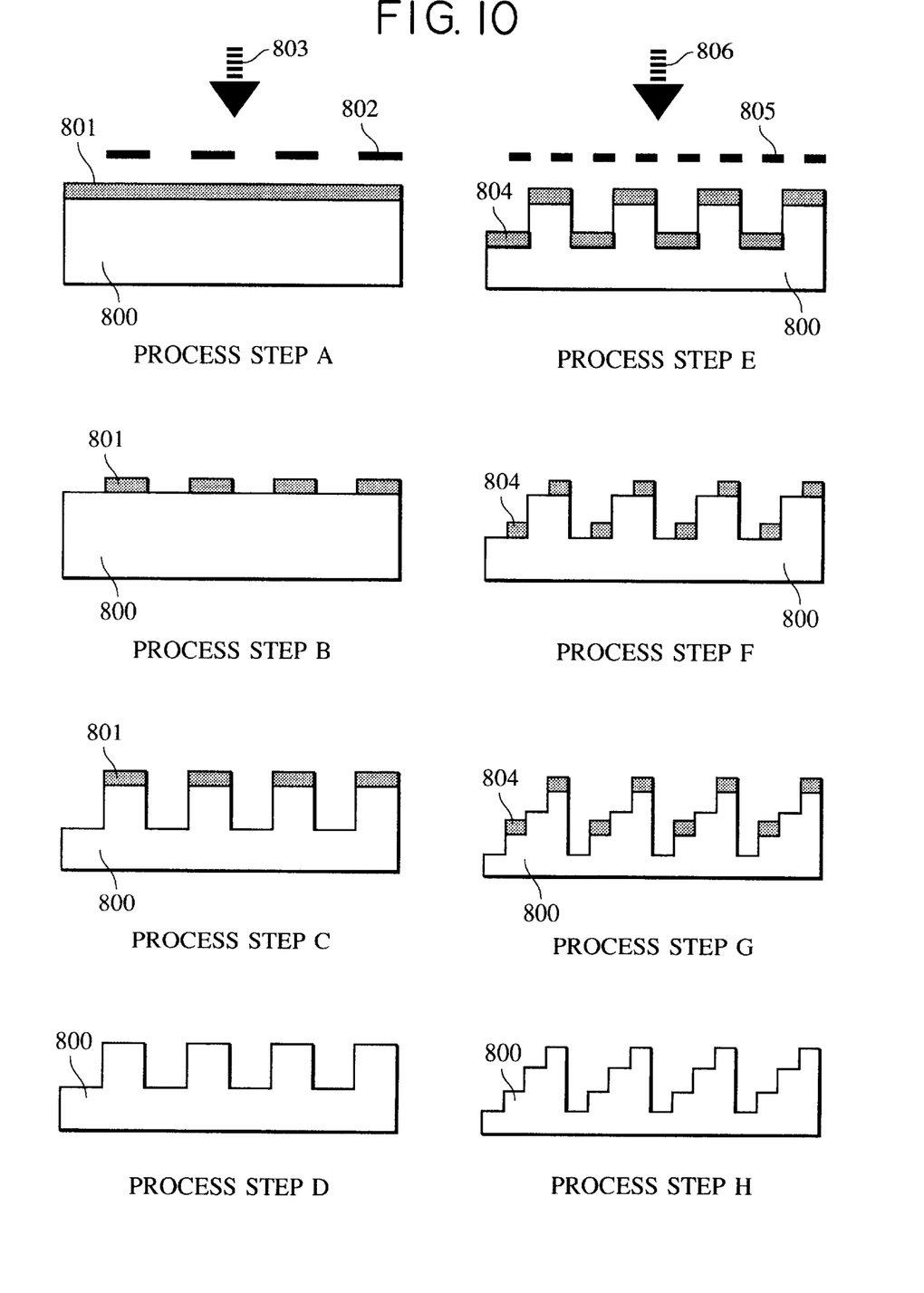
FIG. 10 is an illustration of process steps for producing a binary-type diffractive optical element.

FIG. 10 shows, by way of example, a conventional process for producing a quadruple or 4-level binary-type diffractive optical element. There are shown a transparent glass substrate 800 having a refractive index "n", a resist 801, and a mask 802 used for a primary exposure. Numeral 803 designates exposure light rays. By way of example, a positive resist is used as the resist 801.

In Step A, the pattern of the mask 802 is transferred to the resist 801 by exposure of the resist 801 to the exposure light 803 through the mask 802. In Step B, the resist is subjected to development and, in Step C, etching is effected on the glass substrate 800. Removal of the resist from the substrate 800 is performed in Step D, whereby a duplex or 2-level binary-type diffractive optical element is obtained.

The penetration or depth d1 of etching is determined to meet the condition of:

$$d1 = \lambda/2/(n-1)$$

where, $\lambda$ represents the wavelength of light to be diffracted by the binary-type diffractive optical element.

The glass substrate 800 now carrying the duplex binary-type diffractive optical element formed thereon is then coated with a resist 804. A secondary exposure is performed through a mask 805 in Step E. The pattern of the mask 805 has a pitch that is half the pitch of the pattern of the mask 802. The secondary exposure is conducted such that the edges of the light-shielding regions of the mask 805 are correctly aligned with the edges of the duplex binary-type configuration, so that a pattern as illustrated can be obtained through a developing processing conducted in Step F.

A secondary etching is executed in Step G, followed by Step H which removes the resist, whereby the aimed quadruple, i.e., 4-level, binary-type diffractive optical element is obtained. The depth "d2" of etching is determined to meet the following condition:

$$d2 = \lambda/4/(n-1)$$

Although a quadruple structure has been specifically mentioned in the foregoing description, it will be obvious that an octet, i.e., 8-level, and hexadecimal, i.e., 16-level, binary structures are obtainable through repetition of the described process.

The described process basically provides binary structures having $2^n$ steps, where "n" represents a natural number. However, any desired number of steps can be obtained when the number of masks employed and the widths of pattern lines are suitably selected.

It is true that the diffraction efficiency is reduced to a certain extent as a result of approximation by the stepped configuration. The diffraction efficiency, however, is still as high as about 95% in the case of an octet step structure (8-level) and about 99% in the case of a hexadecimal (16-level) structure, thus ensuring a high level of practical utility.

In most cases, plane parallel plates are used as substrates of diffractive optical elements, because of ease of manufacture. For instance, Japanese Patent Laid-Open No. 7-128590 proposes a diffractive optical element formed on a planar substrate. On the other hand, it is a common understanding that a greater degree of versatility is obtained in regard to correction of aberration when a flat surface of the substrate is substituted by a spherical or an aspherical surface.

Japanese Patent Laid-Open No. 62-229203, as well-as Japanese Patent Laid-Open No. 6-242373, discloses a diffractive optical element formed on a substrate having a spherical or aspherical surface.

Use of a diffractive optical element as a component of an optical system offers various advantages such as ease of correction of aberration, improved transmittance and so forth, depending on the manner of use. However, fabrication of a binary-type diffractive optical element, relying upon repetition of a lithographic process as described before, encounters restrictions due to practical limitations in the exposure process in regard to precision of the mask alignment, minimum pattern line width, and so forth. The performance of a diffractive optical element is ruled mainly by the minimal pitch of the diffraction grating. It has been impossible to produce a binary-type diffractive optical element having a minimum grating pitch of less than 2 or 3 $\mu$m.

A diffractive optical element of the type shown in FIG. 9C simulating the function of a convex lens, as well as diffractive optical elements simulating the functions of a concave lens, convex mirror and concave mirror, usually have a diffraction grating the pitch of which progressively decreases from the center towards the peripheral end of the element. A greater refractive power of the diffractive optical element requires a smaller pitch of the grating and, hence, a correspondingly smaller width of the minimum pattern line. Consequently, the exposure process in the production of a diffractive optical element has to sustain more strict conditions in regard to the precision of mask alignment and fineness of the pattern line.

SUMMARY OF THE INVENTION

Accordingly, it is an object of the present invention to provide a diffractive optical element which is easy to manufacture and also an optical system incorporating such a diffractive optical element.

In accordance with one aspect of the present invention, a diffractive optical element comprises a substrate and a diffraction grating formed on the substrate. The pitch of the diffraction grating varies such that it progressively decreases radially outward over a radial region from the center and is then kept substantially constant towards the radial extremity of the element.

An optical system in accordance with this aspect incorporates a diffractive optical element having the features set forth above.

According to another aspect of the present invention, a diffractive optical element has a substrate, and a diffraction grating and an aspherical surface formed on the substrate. The pitch of the diffraction grating varies such that it progressively decreases radially outward over a radial region from the center and is then kept substantially constant over a predetermined radially outer portion towards the radial extremity of the element. The portion of the aspherical surface corresponding to the above-mentioned radially outer portion over which the grating pitch is substantially constant is a curved surface. An optical system in accordance with this aspect of the invention employs a diffractive optical element having the described features.

In accordance with still another aspect of the present invention, an optical system comprises: a first substrate having a diffraction grating the pitch of which progressively decreases radially outward over a radial region from the center and is then kept constant over a radially outer portion of the grating; and at least one second substrate having an aspherical surface, wherein the portion of the aspherical surface corresponding to the portion of the first substrate over which the grating pitch is substantially constant is a curved surface.

Preferably, the diffraction grating in each aspect is a kinoform-type grating or a binary-type grating.

The present invention also provides an exposure apparatus in which an exposure light beam is focused on a substrate through any of the optical systems stated above.

The invention further provides a process for producing a device having the steps of transferring a device pattern onto a resist on a substrate through the exposure apparatus, and subjecting the substrate having the resist carrying the transferred device pattern to a developing treatment.

The above and other objects, features and advantages of the present invention will become clear from the following description of the preferred embodiments when the same is read in conjunction with the accompanying drawings.

DESCRIPTION OF THE PREFERRED EMBODIMENTS

FIGS. 1A to 1D are illustrations of cross-sectional shapes of optical elements, explanatory of the concept of a binary-type diffractive optical element (referred to also as "binary optics") in accordance with a first embodiment of the present invention. FIG. 2 is a flowchart showing a process for determining the configuration of the diffractive optical element and the configuration of an aspherical surface employed in the diffractive optical element.

In the illustrated first embodiment of the present invention, the diffractive optical element has a diffraction grating whose pitch is constant or substantially constant in a peripheral end region which is radially spaced from the optical axis of the element, i.e., from the center of the substrate. At the same time, the portion of the substrate corresponding to the above-mentioned peripheral region employs an aspherical surface which serves to strengthen the positive refractive power in that region.

A detailed description will now be given of the first embodiment of the diffractive optical element, with specific reference to FIGS. 1A to 1D and FIG. 2. Step 201 determines the configuration of the diffractive optical element 101 which provides desired refractive power, which is positive power in this case, when used in an optical system. The configuration of the diffractive optical element 101 is specifically shown in FIG. 1A. A known process, which determines coefficients of a phase distribution function of a diffractive optical element through an optimizing technique, may be employed for the purpose of determining the configuration of this diffractive optical element 101. The phase distribution function may be, for example, a function represented by a rotational symmetric polynomial which employs order numbers such as 2, 4, 6, 8 and so forth, as in the following equation (1).

$$f(h)=a \cdot h^2+b \cdot h^4+c \cdot h^6+d \cdot h^8+ \quad (1)$$

$$g(h)=2\pi \cdot f(h)/\lambda \quad (2)$$

where, f(h) is an optical path length function, while g(h) is a phase distribution function. Characters "a", "b", "c", "d" and so forth are coefficients of the polynomial, and $\lambda$ indicates the wavelength.

Thus, the configuration of the substrate of the diffractive optical element is determined through determination of the values of the coefficients "a", "b", "c", "d" and so forth.

Figure 1A:
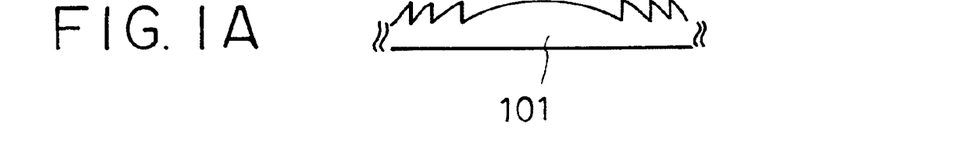
FIGS. 1A to 1D are schematic illustrations of a critical portion of a first embodiment of the present invention.
Figure 1B:
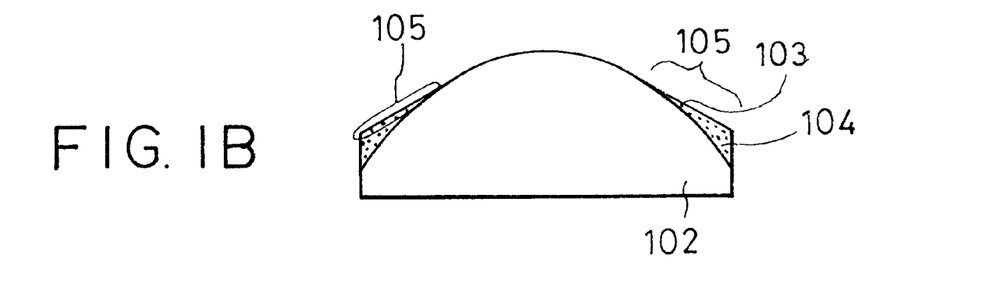
Figure 2:
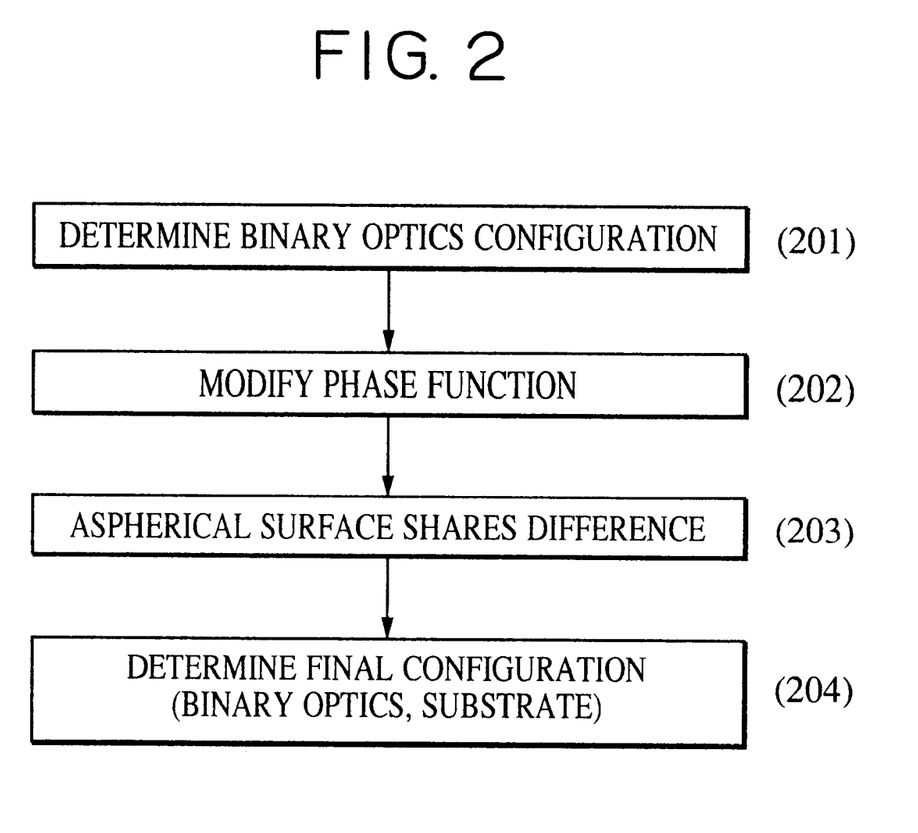
FIG. 2 is a flowchart illustrative of a process in accordance with the first embodiment.

FIG. 1B shows the profile of a refractive optical element having refractive power equivalent to that of the diffractive optical element 101. The relationship between the diffractive optical element 101 and the refractive optical element 102 is the same as that between the diffractive optical element 702 and the refractive optical element 701 described before with reference to FIGS. 9A to 9C.

Referring back to FIG. 2, Step 202 modifies the phase distribution function that has been determined through Step 201. The modification is effected such that the phase distribution becomes substantially linear from an intermediate portion of the polynomial, i.e., from a certain radial position of the diffractive optical element towards the radially outermost end of this element. The phase distribution function in this case may be a spline function. Referring to FIG. 1B, numeral 103 points to a surface of an equivalent refractive optical element 102 which is equivalent to the modified phase distribution function, i.e., equivalent to a diffractive optical element having a peripheral or radially outer end region 105 where the phase distribution function is made substantially linear as a result of the modification.

As will be seen from the foregoing description, in this embodiment, the portion of the phase distribution function corresponding to the radially outermost end region is substantially linear. This is equivalent to such an arrangement that the diffraction grating of the diffractive optical element 101 has a substantially constant pitch in the radially outermost end region of the diffractive optical element 101. In FIG. 1B, numeral 104 designates the difference in configuration between the original surface of the refractive optical element 102 and the-above-mentioned surface 103. This difference also will be referred to as "differential amount".

Referring further to FIG. 2, in Step 203, an aspherical surface shares the differential amount 104, which is the amount of difference between the originally determined surface configuration of the refractive optical element 102 and the surface configuration 103 having a radially outermost end region in which the phase distribution function is substantially linear and which corresponds to the differential amount of the phase distribution function. That is to say, the amount of optical path difference, which remains after determination of the surface configuration 103, is compensated for by the aspherical surface.

In this embodiment, compensation for the optical path difference is effected by forming at least one of the two surfaces of the substrate of the diffractive optical element 101 itself into an aspherical shape. More specifically, referring to FIG. 1C, the diffractive optical element 101 has a plane parallel substrate 107 the portion 104 of which corresponding to the optical path difference has been removed.

The final configuration of Step 204 is obtained by forming a diffraction grating 106 on the above-mentioned substrate 107. The diffraction grating 106 is configured based on a configuration defined by the surface configuration 103 of FIG. 1B, by removing therefrom optical path differences which are integer multiples of the wavelength, and has a radially outermost region where the pitch of the grating is substantially constant. Thus, step 204 determines both the configuration of the diffraction grating 106 having the same refractive power as the diffractive optical element 101 and having a radially outer end portion where the phase distribution function is substantially linear, and the configuration of the aspherical surface which compensates for the optical path difference in the radially outermost end region where the phase distribution function is rendered substantially linear.

Figure 1C:
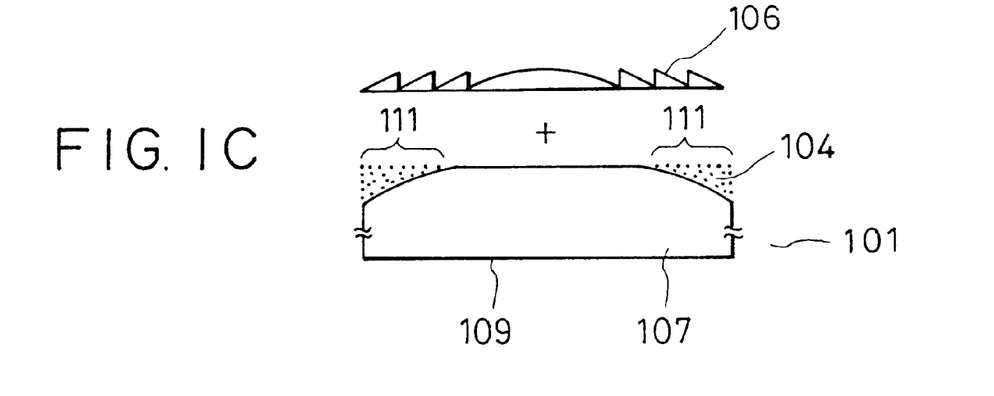
Figure 1D:
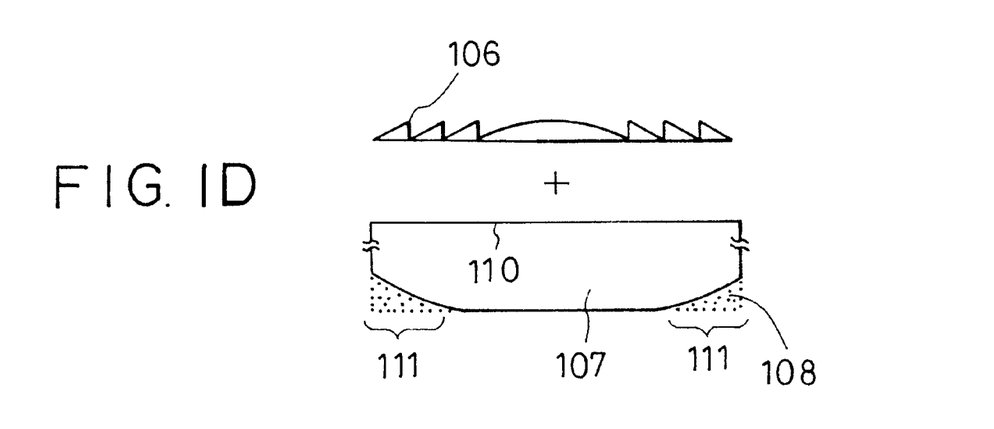

It is to be understood that an equivalent effect to that produced by the arrangement shown in FIG. 1C can be obtained by removing, from the reverse or lower side of the substrate 107 as shown in FIG. 1D rather than from the obverse or upper surface of the same as in FIG. 1C, a portion 108 which corresponds to the differential amount 104, i.e., the amount of difference between the originally determined surface configuration of the refractive optical element 102 and the surface configuration 103 of FIG. 1B. Thus, in the diffractive optical element of this embodiment, the region 111 of the substrate 107, which corresponds to the peripheral region of the diffractive optical element 101 where the grating pitch is substantially constant, has an aspherical surface.

Figure 3A:
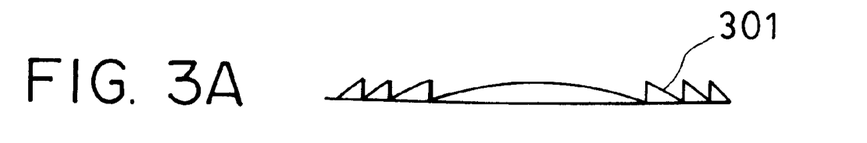
FIGS. 3A to 3D are schematic illustrations of a critical portion of the first embodiment.
Figure 3B:
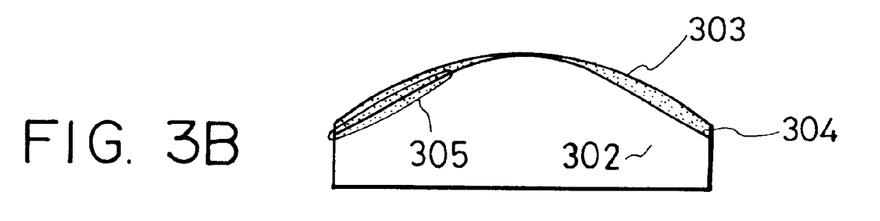
Figure 3C:
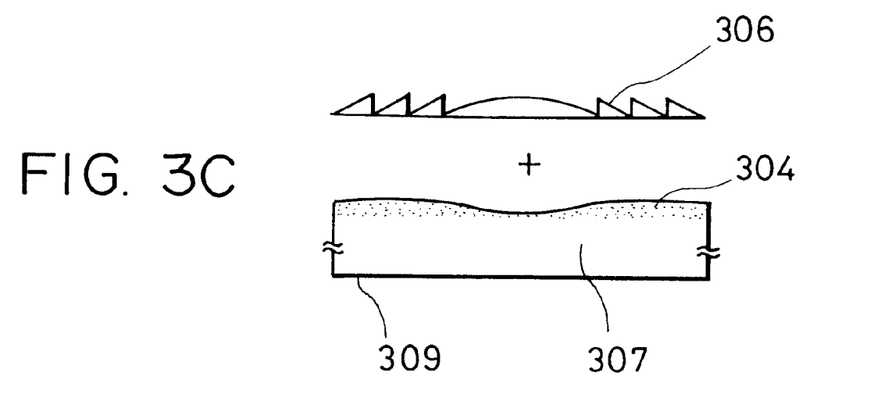
Figure 3D:
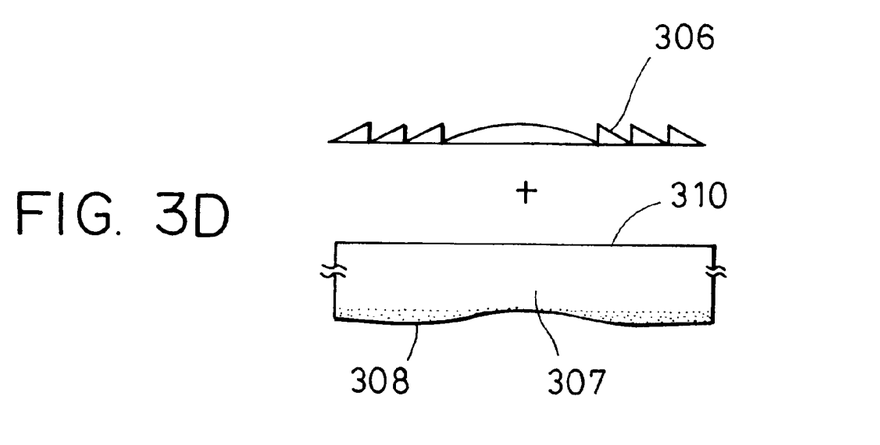

FIGS. 3A to 3D show a modification of the first embodiment. In this modification, a diffractive optical element 301 has a radially outer end region in which the pitch of the diffraction grating is substantially constant and, at the same time, a surface of a planar substrate 307 is made to have an aspherical configuration such that the positive refractive power progressively decreases along the radius away from the optical axis. Similar to the illustrations of FIGS. 1A to 1D mentioned before, FIG. 3A shows the diffractive optical element 301, while FIG. 3B shows a refractive optical element 302 equivalent to the element 301. The diffractive optical element 301 is redesigned in such a manner that the refractive optical element 302 which would be equivalent to the diffractive element 301 as redesigned has a substantially linear surface configuration in the peripheral region 305 thereof, whereby a diffractive optical element 306 as shown in FIG. 3C is obtained. At the same time, the differential amount 304, i.e., the amount of difference in configuration between the refractive optical element 302 equivalent to the original diffractive optical element 301 and the refractive optical element 302 equivalent to the diffractive optical element 306 obtained through the redesigning, is compensated for by suitably configuring a region 308 of the surface of the substrate 307 which corresponds to the above-mentioned peripheral or radially outer end region 305. The diffractive optical element 306 is formed on this substrate 307. The region 308 corresponding to the differential amount 304 may be formed on the reverse or lower side of the substrate 307, as shown in FIG. 3D.

In the embodiment described in the foregoing with reference to FIGS. 1A to 1D and FIGS. 3A to 3D, the diffractive optical element and the aspherical surface are formed on the same side or on opposite sides of the same substrate. This, however, is only illustrative and the arrangement may be such that the diffractive optical element and the aspherical surface are formed on different substrates. When an opaque substrate such as a mirror is used, it is necessary that the diffractive optical element and the aspherical surface be formed on the same side of the substrate.

Figure 4A:
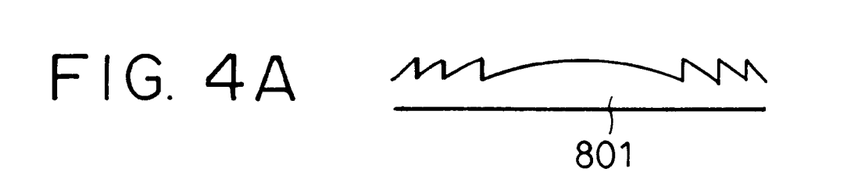
FIGS. 4A to 4C are schematic illustrations of a critical portion of a second embodiment of the present invention.
Figure 4B:
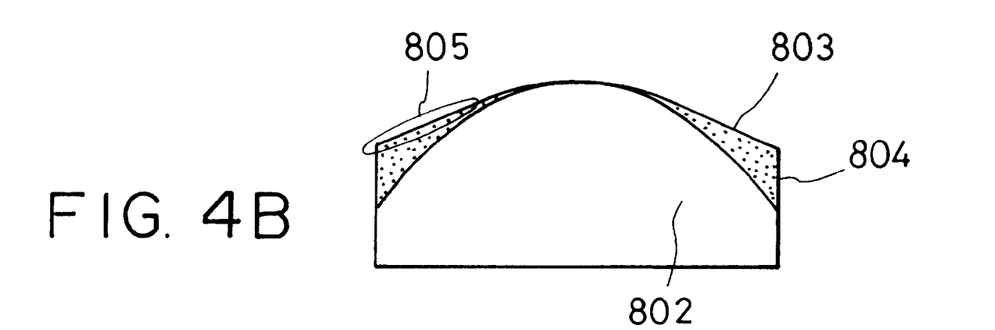
Figure 4C:
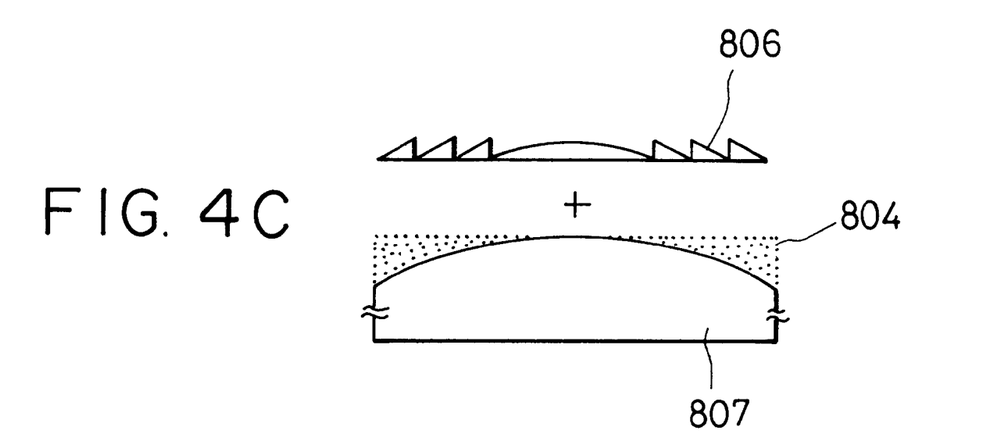

FIGS. 4A to 4C are schematic illustrations of a second embodiment of the present invention. In this embodiment, a diffractive optical element 801 has a peripheral region in which the pitch of the diffraction grating is substantially constant and, at the same time, a surface of the substrate 807 is made to have a refractive aspherical configuration, in order that the positive refractive power progressively increases along the radius towards the radially outer end from the optical axis. The difference between the second embodiment and the first embodiment described before resides in that the former employs a substrate 807 in the form of an aspherical lens having a paraxial refractive power. In the first embodiment described before, the substrate 107 is processed only in regard to the differential amount 104 which is the amount of difference in configuration between the surface configuration 103 of the equivalent refractive optical element 102 modified to have substantially linear configuration in radially outer end region thereof and the original surface configuration of the equivalent refractive optical element 102 having the same refractive power as the diffractive optical element 101. Thus, the surfaces of the substrate 107 near the optical axis are parallel planer surfaces, so that the paraxial refractive power is substantially zero.

In contrast, in the second embodiment, the paraxial refractive power is shared not only by the diffractive optical element 806 but also by the substrate 807. In this embodiment, therefore, the refractive power to be borne by the diffractive optical element 806 is reduced. In addition, the phase distribution function linearly changes in the radially outer end region. For these reasons, the diffractive optical element 806 can have a diffractive grating having a greater constant pitch in the radially outer region spaced radially from the optical axis. In FIGS. 4B and 4C, numeral 802 designates a refractive optical element equivalent to the diffractive optical element 801, while 803 designates the surface configuration of the refractive optical element 802 equivalent to the diffractive optical element having the constant grating pitch in the radially outer end region. The difference in configuration between the original surface configuration of the refractive optical element 802 and the surface configuration 803, i.e., the differential amount, is indicated by 804.

As a modification of this embodiment, an arrangement is conceivable in which the diffractive optical element has positive refractive power, while the substrate 807 has negative refractive power. In such a modification, in order that the diffractive optical element has a substantially constant grating pitch in the radially outer end region, the refractive power of the substrate 807 is negative in the area around the optical axis and is progressively changed from negative to positive along the radius of the substrate from the optical axis towards the radially outer end.

This modification provides a negative Petzval's sum, even if the whole diffractive optical element has positive refractive power, because the substrate is configured to have negative refractive power.

FIGS. 5A to 5D are sectional views of a critical portion of a third embodiment in accordance with the present invention. In this embodiment, the surface of a substrate 407 is so configured as to provide a desired level of negative refractive power in the radially outer end region, in order to obtain a diffractive optical element 401 having negative refractive power and a constant grating pitch in the radially outer end region thereof.

Figure 5A:
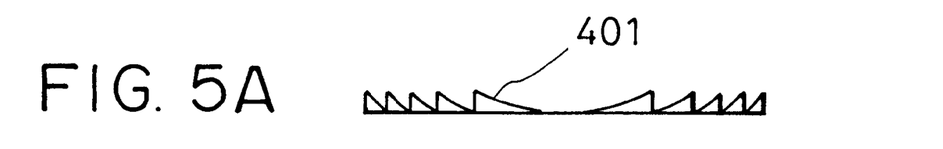
FIGS. 5A to 5D are schematic illustrations of a critical portion of a third embodiment of the present invention.
Figure 5B:
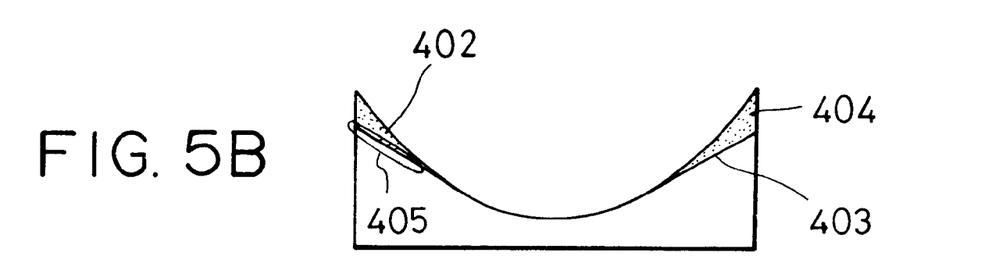

Referring to FIG. 5A, a diffractive optical element 401 having negative refractive power has a smaller pitch of the grating at the radially outer end region than at the central region. FIG. 5B shows the configuration of a refractive optical element that is equivalent in the refractive power to the diffractive optical element 401. A surface configuration 403 that is substantially linear in the radially outer end region 405, i.e., the phase distribution function being substantially linear in the portion thereof corresponding to the radially outer end region 405, is given to the equivalent refractive optical element.

Figure 5C:
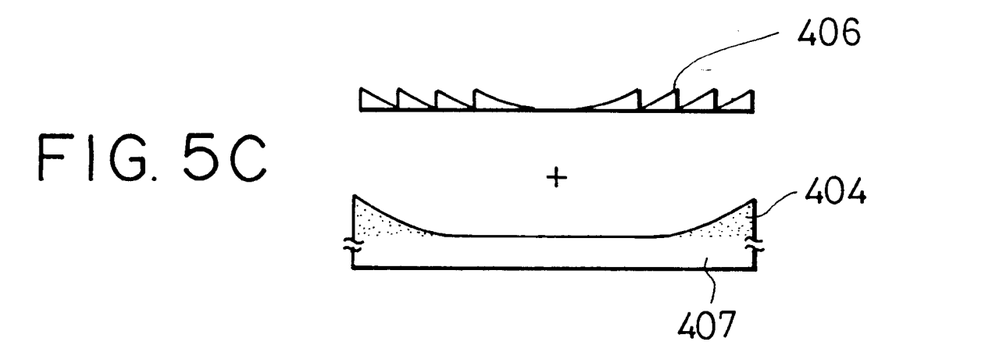

Referring to FIG. 5C, numeral 406 designates a diffraction grating corresponding to the equivalent refractive optical element that has the above-mentioned surface configuration 403. Referring back to FIG. 5B, numeral 404 indicates the difference between the surface configuration of the refractive optical element 402 equivalent to the refractive optical element 401 and the above-mentioned surface configuration 403. In this. embodiment, the difference 404 in configuration is borne by an aspherical surface. The substrate 407 shown in FIG. 5C is processed by an amount corresponding to the above-mentioned difference 404 in configuration, and the grating 406 of the diffractive optical element is formed on the processed substrate 407, whereby a diffractive optical element is obtained having the same refractive power as the diffractive optical element 401 and a constant grating pitch at the radially outer end region.

Figure 5D:
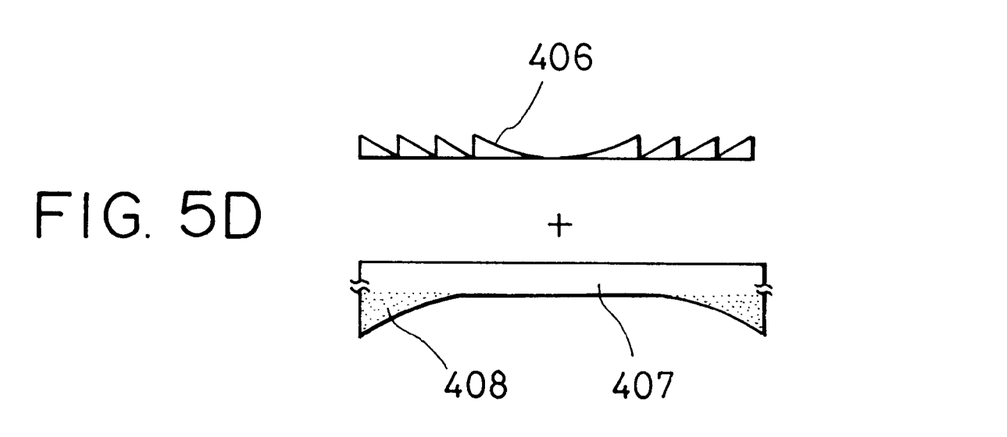

FIG. 5D shows a modification in which the substrate 407 is processed at its reverse side of the substrate 407, i.e., opposite to the side on which the diffraction grating 406 is formed, such that a portion 408 corresponding to the optical path difference, i.e., the difference 404 in configuration as shown in FIG. 5B, is removed from the reverse side of the substrate 407. This modification provides the same advantage as that offered by the third embodiment described with reference to FIGS. 5A to 5C.

FIGS. 6A to 6D show a modification in which the obverse or reverse side of a planar substrate 507 is processed into an aspherical surface so as to progressively reduce the negative refractive power along the radius towards the radial outer end from the optical axis, in order to obtain a diffractive optical element having negative refractive power and a substantially constant grating pitch at the radially outer end region.

Figure 6A:
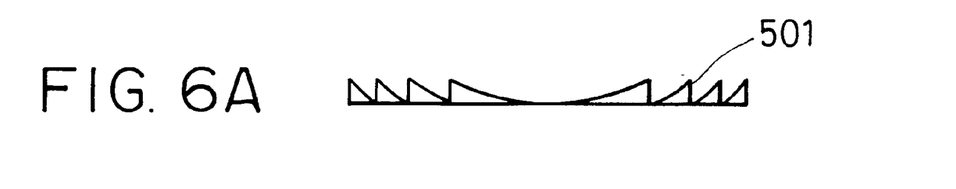
FIGS. 6A to 6D are schematic illustrations of a critical portion of a third embodiment.
Figure 6B:
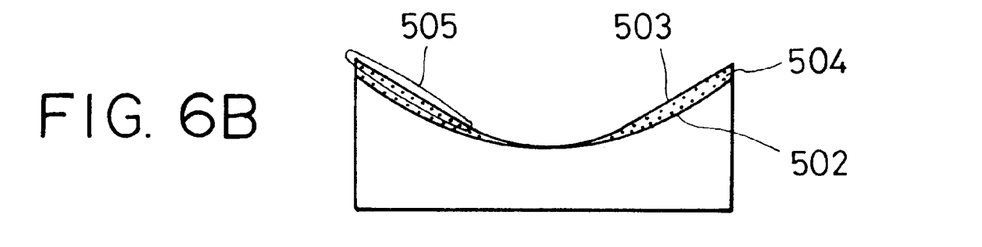
Figure 6C:
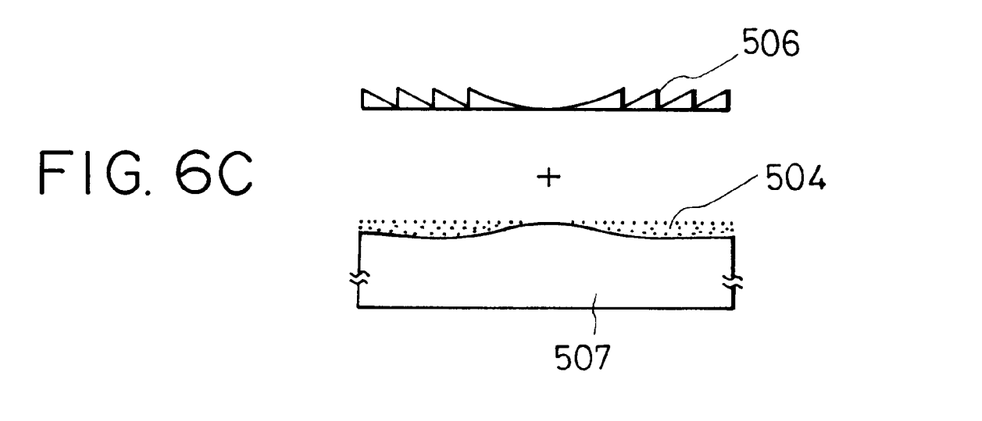
Figure 6D:
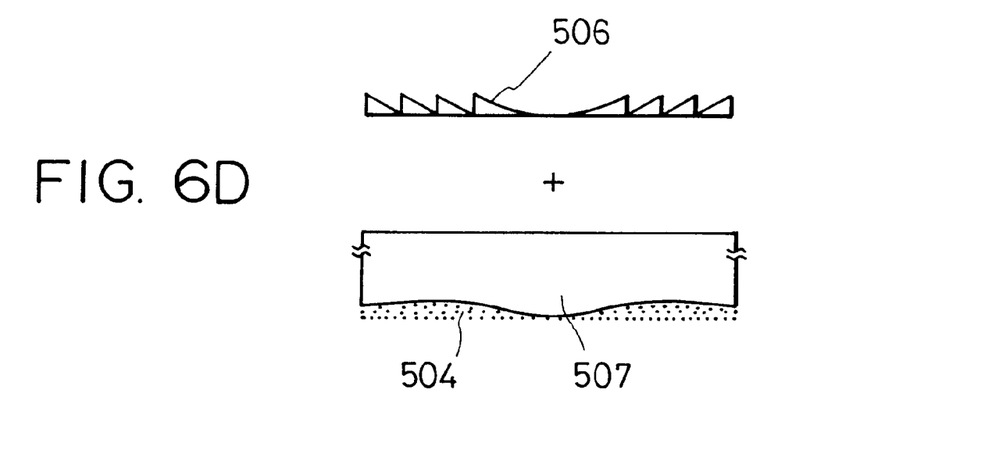

As in the case of the first embodiment shown in FIGS. 1A to 1D, a refractive optical element 502, which is equivalent to a diffractive optical element 501 shown in FIG. 6A, is redesigned such that the redesigned element has a substantially linear configuration 503 at the radially outer end region 505 thereof, followed by determination of a differential amount 504 which is the difference between the original surface of the refractive optical element 502 equivalent to the diffractive optical element 501 and the above-mentioned surface configuration 503. Then, the obverse or reverse side of the substrate 507 is processed to provide an aspherical surface configuration corresponding to the differential amount 504. A diffraction grating 506 is then formed on this substrate 507. FIG. 6C illustrates the case where the aspherical surface is formed on the obverse side of the substrate 507, while FIG. 6D shows the case in which the aspherical surface is formed on the reverse side of the substrate 507.

In order that a substantially constant grating pitch is obtained at the radially outer end region of the diffractive optical element 501, a surface of the substrate 507 may be aspherically configured such that positive refractive power increases along the radius towards the radially outer end from the optical axis, while paraxial refractive power is given to the substrate. Thus, paraxial refractive power is borne not only by the diffractive optical element but also by the substrate, so that the refractory power to be borne by the diffractive optical element is advantageously reduced. In addition, since the phase distribution function changes linearly at the radially outer end region of the diffractive grating 501, it is possible to obtain a greater constant grating pitch in the peripheral region radially spaced away from the optical axis.

Figure 7A:
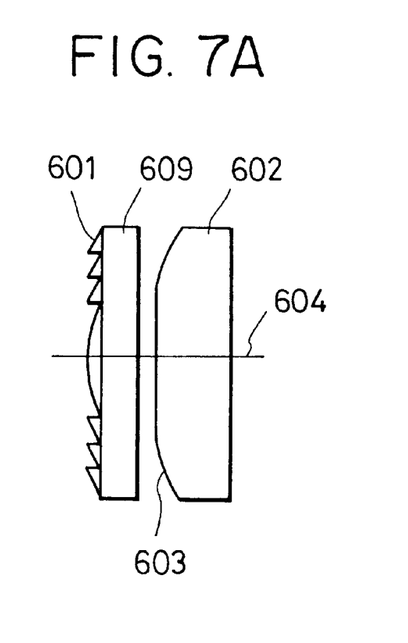
FIGS. 7A and 7B are schematic illustrations of a critical portion of a fourth embodiment of the present invention.
Figure 7B:
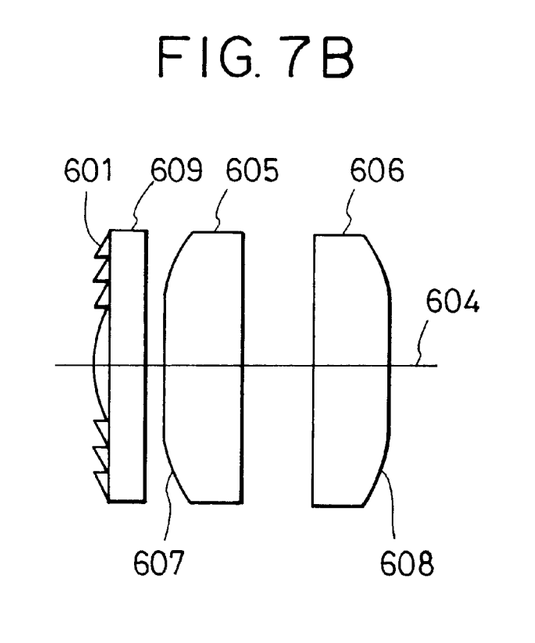

FIGS. 7A and 7B are sectional views of critical portions of a fourth embodiment of the present invention. In this embodiment, unlike the preceding first to third embodiments in which aspherical surfaces are formed on the diffractive optical elements themselves, an optical element that is formed by processing a separate substrate other than that of the diffractive optical element is placed in the vicinity of the latter, thus achieving advantages similar to those produced by the first to third embodiments.

Referring to FIG. 7A, a diffractive optical element 601, i.e., a diffraction grating, is formed on a planar substrate 609. The diffraction grating 609 has a substantially constant grating pitch at its radially outer end region. Another diffractive optical element 602 having an aspherical surface configuration 603 is disposed in the vicinity of the substrate 609, in order that the diffractive optical element 601 and the diffractive optical element 602 in cooperation provide the desired optical performance. Numeral 604 designates the optical axis.

In the arrangement shown in FIG. 7B, as in the case of the arrangement shown in FIG. 7A, diffractive optical elements 605 and 606 having spherical or aspherical surfaces are used in combination with the diffractive optical element 601 with planar substrate 609, in order to obtain the desired optical performance.

In this embodiment also, the surfaces of the substrate 609 of the diffractive optical element 601 need not always be planar but may be configured spherically or aspherically. Similarly, the diffractive optical element 602, as well as the diffractive optical element 605 or 606, may have any suitable surface configuration provided that the surface configuration enables the diffractive optical element to have a substantially constant grating pitch at the radially outer end region thereof.

In each of the first to fourth embodiments as described, a spline function or the like can suitably be used as the phase distribution function of the diffractive optical element. More specifically, a function which can be linearly changed in its part in accordance with an increase in the distance from the optical axis, typically, a spline function, can suitably be used as the phase distribution function.

It is also to be understood that, in the embodiments shown in FIGS. 1A to 1D, the surface 109 or 110 of the substrate 107 opposite to the aspherically configured surface may be planar or spherical, or even a diffractive optical element may be formed on this surface. Similarly, in the embodiments shown in FIGS. 3A to 3D, the surface 309 or 310 of the substrate 307 opposite to the aspherically configured surface may be planar or spherical, or even a diffractive optical element may be formed on this surface.

As will be understood from the foregoing description, the advantages of the present invention can be obtained if only the substrate is processed at its one surface so as to enable the diffractive optical element to have a substantially constant grating pitch at its radially outer end region, no matter the configuration given to the other surface of the substrate. It is also possible to arrange such that the both sides of the substrate are aspherically configured so that the amount of compensation shared by only one surface of the substrate may be shared by both surfaces of the substrate. It is even possible to employ a separate optical element other than the substrate of the diffractive optical element.

Figure 8:
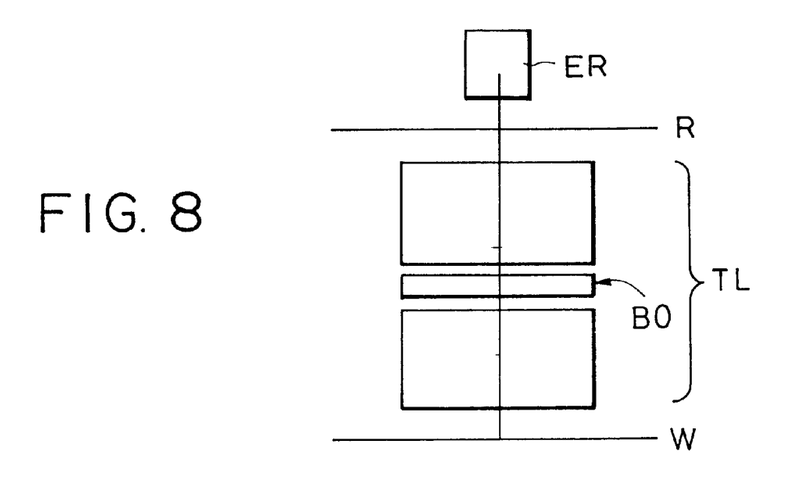
FIG. 8 is a schematic illustration of a critical portion of a fifth embodiment of the present invention.

FIG. 8 is a schematic illustration of a projection exposure apparatus for use in semiconductor production. The exposure apparatus has an optical system incorporating the fifth embodiment of the diffractive optical element of the present invention. More specifically, referring to FIG. 8, a reticle R is illuminated by exposure light rays coming from an exposure illuminating system ER, so that the image of a circuit pattern formed on the reticle R is projected onto the surface of a wafer W through a projection optical system TL. The projection optical system TL has an optical sub-system BO that includes a diffractive optical element having a substantially constant grating pitch at its radially outer end region a compensating optical element, which has an aspherical surface. The wafer W is then subjected to a developing process, which is known, per se, whereby a semiconductor device is obtained.

A description will now be given of an embodiment of a process of the invention for producing a device by using a projection exposure apparatus.

Figure 11:
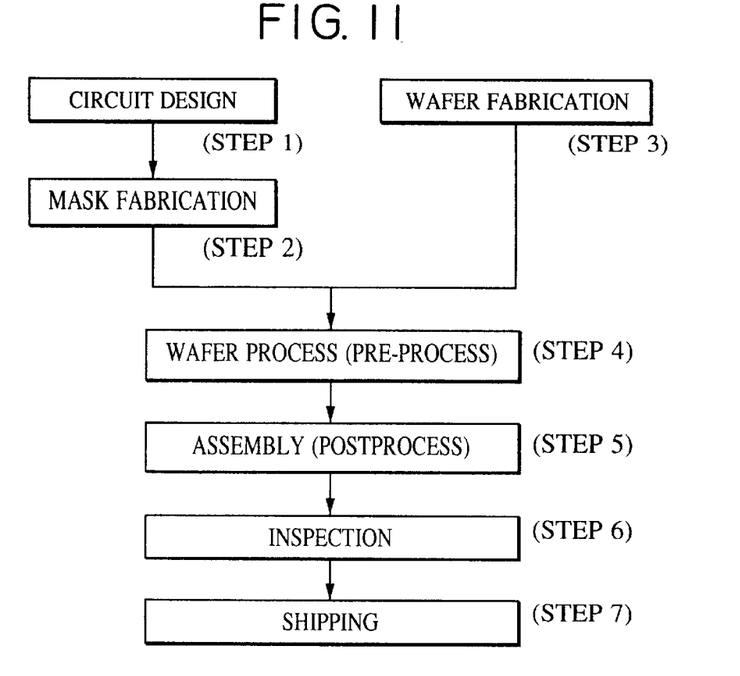
FIG. 11 is a flow chart showing a process of the invention for producing a device.

FIG. 11 is a flowchart showing a process for producing a semiconductor device which may be, for example, a semiconductor chip such as an IC or an LSI, a liquid crystal display panel, a CCD or the like.

Circuit design of the semiconductor device is conducted in Step 1 (circuit design) and, in Step 2 (mask fabrication), a mask having the designed circuit pattern thereon is fabricated.

Meanwhile, a wafer is produced from silicon for example, in Step 3 (wafer fabrication). Step 4 (wafer process), which also is referred to as "pre-process", forms an actual circuit on the wafer by means of a lithographic technique, using the mask and the wafer which have been fabricated and prepared.

Step 5 (assembly), referred to as "post process", forms semiconductor chips from the wafer obtained through Step 4. Step 5 includes sub-steps such as assembly step (dicing and bonding), packaging step (sealing of chips) and so forth.

Step 6 (inspection) conducts inspection and tests such as a test for confirming operation of the semiconductor device obtained through Step 5, durability test of the same, and so on.

Semiconductor devices thus obtained are forwarded in Step 7 (shipping).

Figure 12:
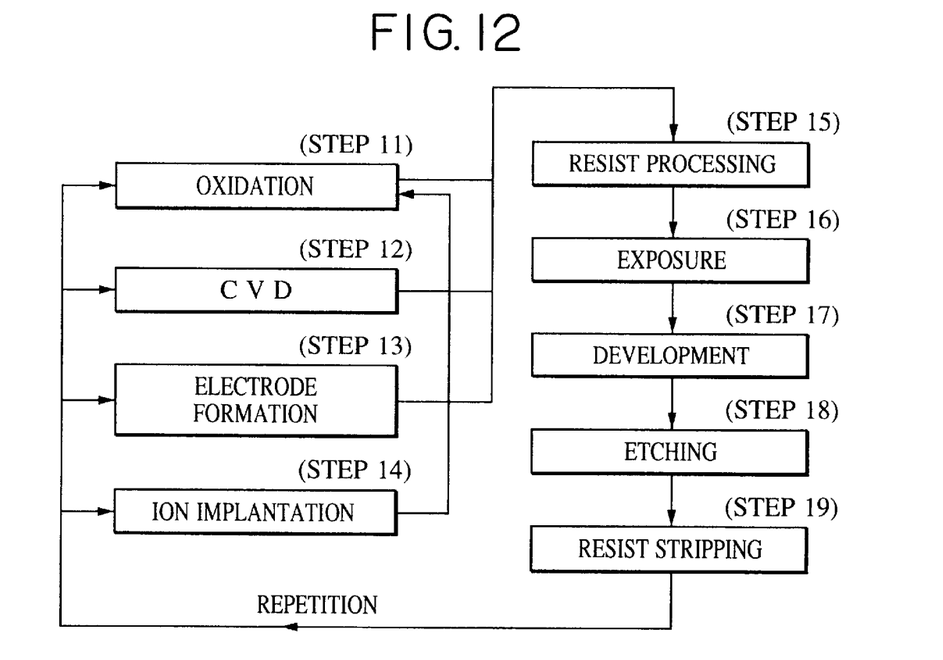
FIG. 12 is a flow chart showing a process of the invention for producing a semiconductor device.

FIG. 12 is a flowchart illustrative of the detail of Step 4 (wafer process) of the flow shown in FIG. 11. In Step 11 (oxidation), the surface of the wafer is oxidized. In Step 12 (CVD), an insulating film is formed on the wafer surface. Step 13 (electrode formation) forms electrodes on the wafer by an evaporation technique. Step 14 (ion implantation) injects ions into the wafer. In Step 15 (resist processing), a photo-sensitizer is applied to the wafer. In Step 16 (exposure), the exposure apparatus described before exposes the wafer to the light rays through the mask carrying the circuit pattern, so that the image of the circuit pattern is printed on the wafer.

Step 17 (development) develops the circuit pattern image on the exposed wafer. Step 18 (etching) removes portions of the resist other than the portions that have been developed. Step 19 (resist stripping) removes the portions of the resist which remain after the etching and which are now unnecessary. The sequence of described steps is repeated so that a multiplex circuit pattern is formed on the wafer.

The described embodiment of the production process of the invention enables easy production of devices having high degrees of integration.

What is claimed is:

1. A diffractive optical element, comprising:

a substrate; and a diffraction grating formed on the substrate, the pitch of said diffraction grating varying such that it progressively decreases outward over one region extending outward from a center towards a predetermined position and is then, in another region extending outward from the predetermined position towards the extremity of said diffraction grating, kept substantially constant, wherein the pitch of said diffraction grating varies according to a spline function as the phase distribution function of said diffractive optical element.

2. A diffractive optical element according to claim 1, wherein a spherical or flat surface is formed in said one region and an aspherical surface is formed in said another region.

3. A diffractive optical element according to claim 1, wherein, in the opposite surface to the surface on which said diffraction grating is formed, a spherical or flat surface is formed in a region corresponding to said one region and an aspherical surface is formed in a region corresponding to said another region.

4. A diffractive optical element according to claim 1, wherein said substrate is transparent.

5. A diffractive optical element according to claim 1, wherein said diffraction grating is a binary-type grating.

6. An optical system comprising:

a diffractive optical element according to claim 1.

7. An exposure apparatus comprising:

an optical system according to claim 1, wherein a device pattern is transferred on a wafer by the light through said optical system.

8. A process for producing a device, comprising the steps of:

transferring a device pattern onto a resist on the wafer through the exposure apparatus of claim 7; and developing the wafer.

9. An optical system comprising:

a first substrate having a diffraction grating, the pitch of said diffraction grating varying such that it progressively decreases outward over one region extending outward from a center towards a predetermined position and is then, in another region extending outward from the predetermined position towards the extremity of said diffraction grating, kept substantially constant; and a second substrate having a surface which comprises an aspherical surface formed in a region corresponding to said another region and a spherical or flat surface formed in a region corresponding to said one region, wherein the pitch of said diffraction grating varies according to a spline function as the phase distribution function of said diffractive optical element.

10. An optical system according to claim 9, wherein said substrate is transparent.

11. An optical system according to claim 9, wherein said diffraction grating is a binary-type grating.

12. An exposure apparatus comprising:

an optical system according to claim 9, wherein a device pattern is transferred on a wafer by the light through said optical system.

13. A process for producing a device, comprising the steps of:

transferring a device pattern onto a resist on the wafer through the exposure apparatus of claim 12; and developing the wafer.

* * * * *

UNITED STATES PATENT AND TRADEMARK OFFICE
CERTIFICATE OF CORRECTION

PATENT NO.    : 6,493,143 B2
DATED         : December 10, 2002
INVENTOR(S)   : Takashi Kato It is certified that error appears in the above-identified patent and that said Letters Patent is hereby corrected as shown below:

<u>Title page,</u>
Item [57], ABSTRACT,
Line 8, "kept" should read -- is kept --.

<u>Column 2,</u>
Line 61, "well-as" should read -- well as --.

<u>Column 4,</u>
Lines 13 and 20, "invention:" should read -- invention; --.

<u>Column 5,</u>
Line 48, "the-above-mentioned" should read -- the above-mentioned --.

<u>Column 8,</u>
Line 19, "this." should read -- this --.

Signed and Sealed this

Ninth Day of September, 2003

JAMES E. ROGAN
*Director of the United States Patent and Trademark Office*